(12) United States Patent
Matsuura et al.

(10) Patent No.: US 8,900,733 B2
(45) Date of Patent: Dec. 2, 2014

(54) SEALED BATTERY AND VEHICLE

(75) Inventors: Tomohiro Matsuura, Toyota (JP);
Katsumi Ito, Seto (JP); Akira Fujii,
Asago (JP); Toshihiro Odagaki, Asago
(JP)

(73) Assignees: Toyota Jidosha Kabushiki Kaisha,
Toyota-shi, Aichi-ken (JP); **Fuji Springs
Co., Inc.**, Asago-shi, Hyogo (JP)

( * ) Notice: Subject to any disclaimer, the term of this patent is extended or adjusted under 35 U.S.C. 154(b) by 0 days.

(21) Appl. No.: 13/375,820

(22) PCT Filed: Jun. 2, 2010

(86) PCT No.: PCT/IB2010/001315
§ 371 (c)(1),
(2), (4) Date: Dec. 2, 2011

(87) PCT Pub. No.: WO2010/140045
PCT Pub. Date: Dec. 9, 2010

(65) Prior Publication Data
US 2012/0088128 A1    Apr. 12, 2012

(30) Foreign Application Priority Data
Jun. 4, 2009  (JP) .................................. 2009-135600

(51) Int. Cl.
*H01M 2/12*   (2006.01)
(52) U.S. Cl.
CPC .............. *H01M 2/1241* (2013.01); *Y02E 60/12* (2013.01)
USPC ......................................................... 429/56
(58) Field of Classification Search
USPC ......................................................... 429/56
See application file for complete search history.

(56) References Cited

U.S. PATENT DOCUMENTS 6,265,096 B1 *  7/2001 Tucholski et al. ............... 429/53
6,571,816 B2 *  6/2003 Morishita et al. .......... 137/68.27
(Continued)

FOREIGN PATENT DOCUMENTS

CN    1313642     9/2001
CN    1591929     3/2005
(Continued)

OTHER PUBLICATIONS

International Search Report in International Application No. PCT/IB2010/001315; Mailing Date: Aug. 4, 2010.
(Continued)

*Primary Examiner* — Ula C Ruddock
*Assistant Examiner* — Scott J Chmielecki
(74) *Attorney, Agent, or Firm* — Finnegan, Henderson, Farabow, Garrett & Dunner, LLP

(57) ABSTRACT

A safety valve (40, 140, 240, 340) formed in a portion of a case of a sealed battery includes a fracture groove portion (50, 150, 250, 350) formed in a thin portion (42, 142, 242, 342). The thin portion (42, 142, 242, 342) is formed in a horizontally long shape or a vertically long shape that has a curved outer edge portion (45, 145, 245, 345) in which at least a portion of the outer edge portion (43) is curved. This thin portion (42, 142, 242, 342) has a center straight groove portion (60, 160, 260, 360) that extends in the longer direction of the thin portion in the center portion of the thin portion, and a pair of side groove portions (70, 170, 270, 370) that are formed in both side in the longer direction of the center straight groove portion (60, 160, 260, 360) and connected to longer direction end portions (60A, 60B, 160A, 160B, 260A, 260B) of the center straight groove portion. Here, a portion of the side groove portion (70, 170, 270, 370) is formed curved following the curved outer edge portion (45, 145, 245, 345).

14 Claims, 13 Drawing Sheets

(56) References Cited

U.S. PATENT DOCUMENTS

| | | | |
|---|---|---|---|
| 2001/0007729 A1* | 7/2001 | Kitoh et al. | 429/164 |
| 2001/0027807 A1 | 10/2001 | Morishita et al. | |
| 2002/0081482 A1* | 6/2002 | Takada et al. | 429/53 |
| 2008/0171260 A1* | 7/2008 | Kim et al. | 429/82 |

FOREIGN PATENT DOCUMENTS

| | | |
|---|---|---|
| EP | 1 132 983 | 9/2001 |
| JP | 11-250885 | 9/1999 |
| JP | 11-273640 | 10/1999 |
| JP | 2001-35467 | 2/2001 |
| JP | 2001-102024 | 4/2001 |
| JP | 2001-256944 | 9/2001 |
| JP | 2002-25525 | 1/2002 |
| JP | 2005-71836 | 3/2005 |

OTHER PUBLICATIONS

Written Opinion of the International Searching Authority in International Application No. PCT/IB2010/001315; Mailing Date: Aug. 4, 2010.

Applicant's Response to the Written Opinion of the International Searching Authority in International Application No. PCT/IB2010/001315 (Nov. 12, 2010).

* cited by examiner

F I G . 8
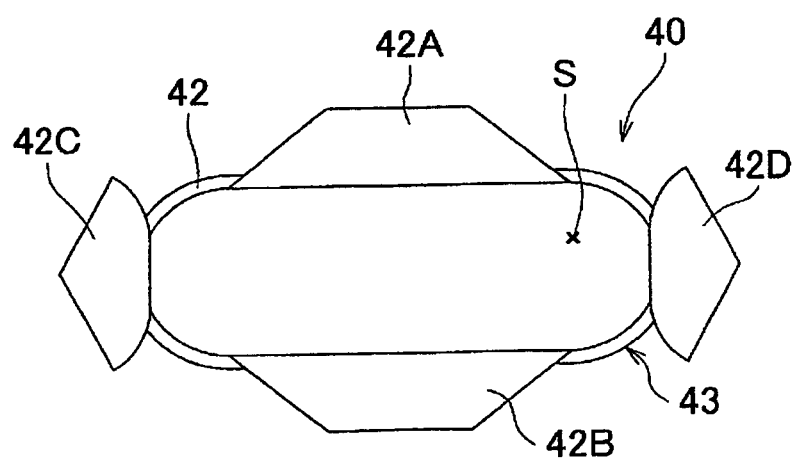

SEALED BATTERY AND VEHICLE

CROSS-REFERENCE TO RELATED APPLICATIONS

This application is a national phase application of International Application No. PCT/IB2010/001315, filed Jun. 2, 2010, and claims the priority of Japanese Application No. 2009-135600, filed Jun. 4, 2009, the contents of both of which are incorporated herein by reference.

BACKGROUND OF THE INVENTION

1. Field of the Invention

The invention relates to a sealed battery in which an electrode body is housed together with an electrolyte inside a sealed case. More particularly, the invention relates to a sealed battery provided with a safety valve that opens when the internal pressure of the case rises. The invention also relates to a vehicle provided with this sealed battery.

2. Description of the Related Art

Lithium-ion batteries and other sealed secondary batteries have become increasingly important in recent years as onboard power supplies for vehicles and power supplies for personal computers and portable terminals and the like. In particular, lithium-ion batteries, which are lightweight and capable of obtaining high energy density, are also used as onboard high output power supplies for vehicles. These sealed batteries are typically provided with an internal pressure release mechanism for releasing the gas pressure inside the case (i.e., the internal pressure) when it rises excessively due to overcharging or the like. Japanese Patent Application Publication No. 11-273640 (JP-A-11-273640), Japanese Patent Application Publication No. 2001-102024 (JP-A-2001-102024), and Japanese Patent Application Publication No. 2001-256944 (JP-A-2001-256944), for example, describe one representative example of such an internal pressure release mechanism that is a so-called safety valve that is made by forming a thin portion (typically made of metal) that is thinner than any other part of the case in a portion of the case. This safety valve is structured such that when the internal pressure of the case becomes equal to or greater than a predetermined value (i.e., an opening pressure), the thin portion fractures (opens) to release that internal pressure.

FIG. 15 shows one example of the structure of the safety valve formed in a portion of a sealed battery case. The safety valve 2 shown in the drawing is formed from a thin portion 3 having a horizontally long shape (more specifically, an oval shape in which both sides in the longer direction are semicircles) and thinner than any other part of the battery case, and a fracture groove portion (an impressed portion) 4 formed in the thin portion 3. If the internal pressure of the case becomes equal to or greater than a predetermined value (i.e., an opening pressure), that internal pressure will cause the fracture groove portion 4 to fracture and the thin portion 3 will typically turn outward, thereby opening the valve, as shown in FIG. 16.

With the safety valve 2 described above, the area of the open portion S of the thin portion 3 that opens tends to be limited, as shown in FIG. 16. In particular, it is difficult for the openings at both end portions in the longer direction of the horizontally long shaped (or vertically long shaped) thin portion to open. However, with this type of safety valve, when the internal pressure of the case rises above a predetermined level, it is necessary to open the valve as quickly as possible and open the thin portion wider in order to quickly release the gas generated in the case outside the battery. However, if a surplus of fracture groove portions are formed in the thin portion or the depth of the fracture groove portion is made excessively deep (i.e., if the groove portion is made extremely thin) in order to accomplish this, the safety valve may open before the internal pressure of the case exceeds the predetermined level (such as when the internal pressure rises abnormally).

Therefore, forming a surplus of the excessive fracture groove portions in the thin portion or making the depth of the fracture groove portion excessively deep (i.e., making the groove portion extremely thin) may also result in variation in the internal pressure of the case at which the valve opens among individual batteries (among safety valves provided in individual batteries). Also, if the thin portion is formed too large, it May reduce the strength of the case and the thin portion may break with sudden vibration or impact.

SUMMARY OF THE INVENTION

This invention therefore provides a sealed battery having a safety valve that opens efficiently when the internal pressure of the case reaches a predetermined level (i.e., a preset valve-opening pressure), and ensures a sufficient opening area when the valve is open. The invention also provides a vehicle having such a sealed battery.

A first aspect of the invention relates to a sealed battery. The sealed battery includes an electrode body that forms a positive electrode and a negative electrode, an electrolyte, and a sealed case that houses the electrode body and the electrolyte. A safety valve that opens when the internal pressure of the case rises to equal to or greater than a predetermined value is formed in a portion of the case. The safety valve includes a thin portion formed thinner than the surrounding portion of the safety valve, and a fracture groove portion formed in the thin portion. The thin portion differs in size between a longer direction and a shorter direction, and includes a curved outer edge portion in which at least a portion of the outer edge portion of both ends, or near both ends, in the longer direction is formed so as to be curved. A typical shape may be, for example, a horizontally long (or vertically long) shape referred to an oval shape, an elliptical shape, a long rounded rectangular shape, a racetrack shape, or the like. The fracture groove portion includes a center (centre) straight groove portion that extends in the longer direction of the thin portion in a center portion of the thin portion, and a pair of side groove portions, each of which formed on each side in the longer direction of the center straight groove portion and connected to a corresponding longer direction end portion of the center straight groove portion. Here, at least a portion of the side groove portions is formed so as to be curved following the curved outer edge portion.

According to this aspect, when the internal pressure of the case becomes equal to or greater than a predetermined level, the safety valve is able to open efficiently (i.e., the fracturing of the fracture groove portion leads to the opening of the thin portion). At this time, the fracture groove portion makes it possible to form (open) a wide open portion that has an opening area of a predetermined level in the thin portion. That is, with the sealed battery having this structure, after the internal pressure of the case rises, the center straight groove portion that receives most of the force from that internal pressure fractures (i.e., splits) from the internal pressure of the case. This fracturing (i.e., splitting) of the center straight groove portion then leads to the fracturing (i.e., splitting) of both side groove portions that are connected to the center straight groove portion. At this time, the side groove portions of the safety valve having this structure is such that the portions along the curved outer edge portion at both end portions in the longer direction of the thin portion are formed curved (i.e., are formed curved parallel (and close) to the curved outer edge portion with a constant predetermined gap therebetween). Therefore, the curved portion fractures or bends outward, which causes not only both sides of the center straight groove portion, but also both side groove portions that are connected to the center straight groove portion, to efficiently split, thereby enabling both end portions in the longer direction of the thin portion to efficiently open over a large area.

In the aspect described above, the fracture groove portion may be formed such that the thickness of the center straight groove portion is thinner than the thickness of the side groove portions.

According to this structure, the center straight groove portion of the fracture groove portion described above is more easily able to fracture (i.e., split) before the side groove portion. Therefore, the thin portion is able to open efficiently. Also, dispersion in the valve-opening pressure of the safety valve among battery products is able to be prevented.

In the structure described above, the side groove portions may become thicker in a continuous or stepped manner farther away from the center straight groove portion. In other words, the side groove portions may become thinner in a continuous or stepped manner closer toward the center straight groove portion.

According to this structure, after the center straight groove portion fractures (i.e., splits), the side groove portion is able to sequentially fracture (i.e., split) from the area toward the center of the thin portion toward the ends in the longer direction, which enables the valve to open smoothly over a wide opening area.

In the structure described above, the thin portion may be formed in an oval shape, a round-cornered rectangular shape, or an elliptical shape, in which the outer edge of both end sides in the longer direction is formed by the curved outer edge portion. The side groove portions of the fracture groove portion may each include a curved groove portion formed in a curved shape that follows the curved outer edge portion of the oval-shaped or elliptical-shaped thin portion, and a pair of connecting straight groove portions that connect the corresponding longer direction end portion of the center straight groove portion to both ends of the curved groove portion.

According to this structure, when the internal pressure of the case becomes equal to or greater than a predetermined level, the fracturing of the center straight groove portion and the connected straight groove portion cause the thin portions on both sides (i.e., the center region in the longer direction of the oval-shaped or elliptical-shaped thin portion) along the center straight groove portion to open outward. Further, the fracturing (i.e., splitting) of the side groove portion causes the thin portion at both end regions in the longer direction to efficiently open outward. Therefore, a wide open portion (i.e., opening) is able to be formed when the internal pressure of the case becomes equal to or greater than the predetermined level.

In the structure described above, the curved groove portion may be formed as a continuous curved groove portion or a discontinuous curved groove portion.

In the structure described above, the fracture groove portion may be formed such that the thickness of the center straight groove portion is thinner than the thickness of the side groove portions, and the thickness of the connecting straight groove portions of the side groove portions is thinner than the thickness of the curved groove portions.

According to this structure, the center straight groove portion of the fracture groove portion described above fractures (i.e., splits) before the side groove portion, and after the center straight groove portion fractures (i.e., splits), the side groove portion is able to sequentially fracture (i.e., split) from the area toward the center of the thin portion toward the ends in the longer direction, which enables the valve to open smoothly over a wide opening area.

In the structure described above, the thickness of the center straight groove portion may be approximately equal to or greater than 30 μm but less than 50 μm, and the thickness of the side groove portions may be approximately equal to or greater than 50 μm but less than 100 μm.

In the structure described above, the thickness of the connecting straight groove portions may be approximately equal to or greater than 50 μm but less than 80 μm, and the thickness of the curved groove portions may be approximately equal to or greater than 80 μm but less than 100 μm.

In the structure described above, the center straight groove portion may be formed in the longer direction in the center portion of the thin portion so as to have a length that is equal to or less than one-half of the length in the longer direction of the thin portion.

According to this structure, the level of the stress applied to the center straight groove portion when the internal pressure of the case rises can be made substantially equal across the entire center straight groove portion. As a result, the degree of stress applied to the center straight groove portion is not different at each position of the groove portion. Therefore, the center straight groove portion fractures (i.e., splits) correctly at the predetermined internal pressure level, and deviation in the valve-opening pressure of the safety valve among battery products can be prevented. Also, the center straight groove portion is able to fracture (i.e., split) smoothly.

In the structure described above, each of the side groove portions may include an extended portion that extends the center straight groove portion of the fracture groove portion to abut against the curved groove portion of the side groove portion.

In the structure described above, the sealed battery may be a lithium secondary battery (typically a lithium-ion battery).

According to this structure, with a lithium secondary battery, the internal pressure of the battery case tends to rise due to gas produced inside the case, so the invention is easily applied.

A second example embodiment of the invention relates to a vehicle that includes the sealed battery according to any one of the structures of the first aspect.

The sealed battery according to the first aspect is provided with a safety valve having a structure in which the valve opens efficiently when the internal pressure of the case reaches a predetermined level and a sufficient opening area is able to be ensured. Therefore, this sealed battery may be used as a power supply for a motor (i.e., an electric motor) mounted in a vehicle such as an automobile (typically, an automobile provided with an electric motor such as a hybrid vehicle, an electric vehicle, or a fuel cell vehicle, in particular).

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 8 is a view showing a frame format of the safety valve shown in FIG. 3 in an open state;

DETAILED DESCRIPTION OF EMBODIMENTS

Figure 1:
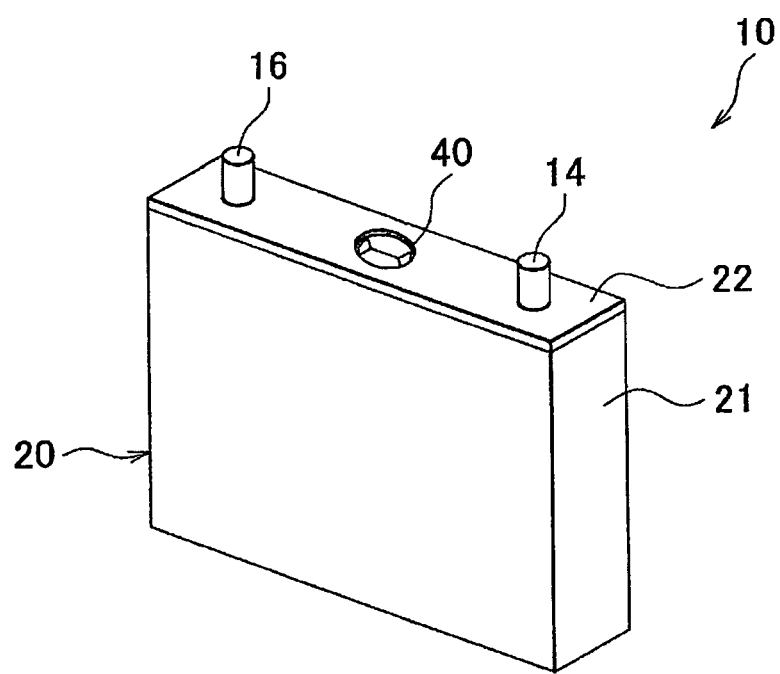
FIG. 1 is a perspective view showing a frame format of a sealed battery according to a first example embodiment of the invention.

Example embodiments of the present invention will be described in greater detail below with reference to the accompanying drawings. The invention may be carried out based on the content described in this specification and typical art in the field. In particular, although the invention is not intended to be limited, in the example embodiments, the sealed battery that is described as an example is a sealed lithium secondary battery (i.e., a lithium-ion battery) in which a wound type of electrode body (hereinafter referred to as "wound electrode body") is housed together with a nonaqueous electrolyte solution in a square (box-shaped) case. Incidentally, the dimensional relationships (such as length, width, and thickness) in the drawings do not reflect the actual dimensional relationships. Also, members and portions having the same operation will be denoted by the same reference characters, and redundant descriptions will be simplified or omitted.

Figure 2:
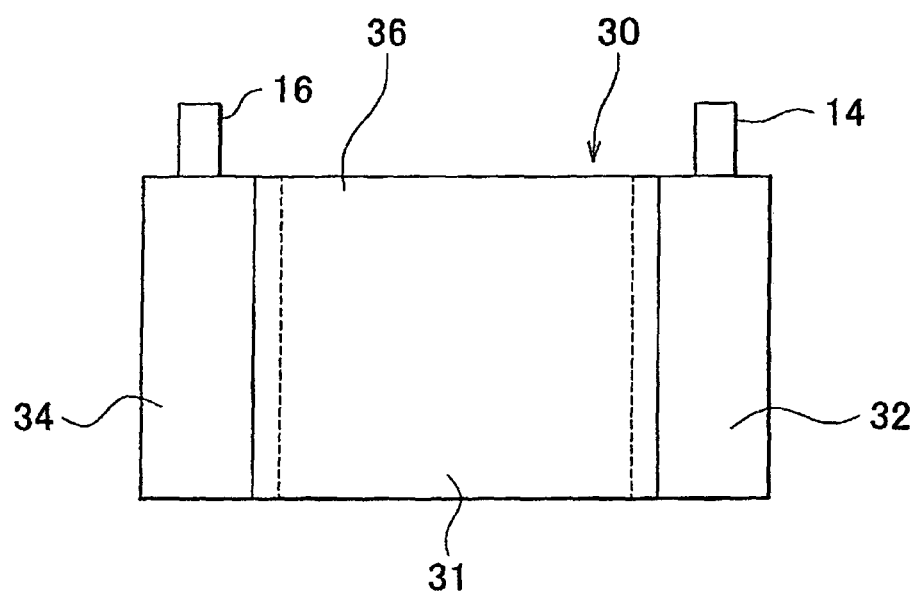
FIG. 2 is a side view showing a frame format of an electrode body and electrode terminals according to the first example embodiment of the invention.

A lithium-ion battery 10 according to the first example embodiment of the invention has a structure in which a wound electrode body 30 such as that shown in FIG. 2 is housed together with a liquid electrolyte (i.e., electrolyte solution), not shown, in a flat square battery case (i.e., an outer case) 20 such as that shown in FIG. 1. The case 20 is formed of a box-shaped (i.e., a square cylinder shape with a bottom) case main body 21 having an open portion at one end (which corresponds to an upper end portion during normal use of the battery 10 according to this example embodiment), and a covering body (a constituent part of the case) 22 that is attached to and covers the open portion. A positive electrode terminal 14 and a negative electrode terminal 16, which are used for external connections, are fixed to the covering body 22. One end (i.e., the outside end) of each of these electrode terminals 14 and 16 protrudes outward from the case 20 (i.e., the covering body 22). The other end (i.e., the inside end) of the electrode terminal 14 is electrically connected to a positive electrode 32 of the electrode body 30, while the other end (i.e., the inside end) of the electrode terminal 16 is electrically connected to the other end (i.e., the inside end) of a negative electrode 34 of the electrode body 30.

The material of the case 20 is not particularly limited as long as it can generally be used with a sealed battery. The case 20 is made mainly of metal material that is lightweight and has good thermal conductivity, such as aluminum (aluminium), stainless steel, and nickel-coated steel, for example. The case 20 (or more specifically, the main body 21 and the covering body 22) in this example embodiment is made of aluminum or an alloy that has aluminum as its main component. The outer shape of the covering body 22 is a generally rectangular plate shape overall. Terminal outlet holes, not shown, through which the electrode terminals 14 and 16 pass are formed in the two end portions in the length direction. A safety valve 40 structured so as to release the internal pressure of the case 20 if that internal pressure rises to a predetermined value (such as approximately 0.3 to 1.0 MPa) or higher is formed in the center (centre) portion, in the width direction, of a portion of the covering body 22 that is positioned between the electrode terminals 14 and 16. The structure and mechanism of the safety valve 40 in this example embodiment will be described later.

As shown in FIG. 2, the wound electrode body 30 is manufactured by overlaying the long sheet-shaped positive electrode (i.e., positive electrode sheet) 32 and negative electrode (i.e., negative electrode sheet) 34 together with a total of two long sheet-shaped separators (i.e., separator sheets) 36 and winding them in the length direction, just like the wound electrode body of a normal lithium-ion battery, and then flattening out the resultant wound body from the sides. More specifically, the positive electrode sheet 32 and the negative electrode sheet 34 are wound offset somewhat in the width direction such that one end of the positive electrode sheet 32 in the width direction protrudes from one end of the separator sheet in the width direction and one end of the negative electrode sheet 34 in the width direction protrudes from the other end of the separator sheet in the width direction. As a result, a portion in which one end of the positive electrode sheet 32 in the width direction protrudes outward from a wound core portion 31 (i.e., the portion where the positive electrode sheet 32, the negative electrode sheet 34, and the separator sheet are tightly wound) is formed on one end portion of the wound electrode body 30 in the direction of the winding axis, and the positive electrode terminal 14 is connected to this protruding portion. Similarly, a portion in which one end of the negative electrode sheet 34 in the width direction protrudes outward from that wound core portion 31 is formed on the other end portion of the wound electrode body 30 in the direction of the winding axis, and the negative electrode terminal 16 is connected to this protruding portion.

The material of the wound electrode body 30 and the member itself are not particularly limited and may be the same as those of an electrode body provided in a typical lithium-ion battery. For example, the positive electrode sheet 32 may have a structure in which a positive electrode active material layer is formed on a long positive electrode collector (aluminum foil, for example). One or two or more types of material conventionally used in lithium-ion batteries may be used, with no particular limitations, as the positive electrode active material used to form this positive electrode active material layer. Examples include lithium transition metal oxides such as $LiMn_2O_4$, $LiCoO_2$, and $LiNiO_2$. The negative electrode sheet 34 may have a structure in which a negative electrode active material layer is formed on a long negative electrode collector (copper foil, for example). One or two or more types of material used in lithium-ion batteries may be used, with no particular limitations, as the negative electrode active material used to form this negative electrode active material layer. Examples include carbon-based material such as graphite carbon and amorphous carbon, lithium transition metal oxides, and lithium transition metal nitrides. One is example of the separator sheet is a separator sheet made of porous polyolefin resin.

A nonaqueous electrolyte solution like the nonaqueous electrolyte solution used in a lithium-ion battery may be used, with no particular limitations, as the liquid electrolyte (i.e., the electrolyte solution). The composition of this nonaqueous electrolyte solution is typically an appropriate nonaqueous solvent containing a supporting electrolyte. One or two or more types, selected from the group consisting of ethylene carbonate, propylene carbonate, dimethyl carbonate, diethyl carbonate, ethyl methyl carbonate, 1,2-dimethoxyethane, 1,2-diethoxyethane, tetrahydrofuran, 1,3-dioxolan, and the like, may be used as the nonaqueous solvent. Also, a lithium salt such as $LiPF_6$, $LiBF_4$, $LiAsF_6$, $LiCF_3SO_3$, $LiC_4F_9SO_3$, $LiN(CF_3SO_2)_2$, and $LiC(CF_3SO_2)_3$, or the like may be used as the supporting electrolyte. In this example embodiment, an electrolyte solution of a mixed solvent of ethylene carbonate and diethyl carbonate (at a mass ratio of 1:1, for example) that contains $LiPF_6$ at a concentration of approximately 1 mol/liter is used. Incidentally, a solid-state or gel-state electrolyte may be used instead of the electrolyte solution.

Next, one method of manufacturing the lithium-ion battery 10 having the members structured as described above will be briefly described. First, the outside ends of the positive and negative electrode terminals 14 and 16 are made to protrude outward from the covering body 22, and these terminals 14 and 16 are fixed to the covering body 22. The covering body 22 and the electrode body 30 are connected by connecting (e.g., welding) the inside ends of these terminals 14 and 16 to the positive and negative electrodes 32 and 34, respectively, of the wound electrode body 30. Then, the electrode body 30 that is connected to the covering body 22 is placed into the case main body 21 through the open portion of the case main body 21, the covering body 22 is fitted over the open portion, and the joint between the covering body 22 and the case main body 21 is sealed by laser welding, for example. Next, the electrolyte solution is filled into the case 20 through an electrolyte solution filler hole, not shown, after which the electrolyte solution filler hole is closed and the case 20 is sealed. In this way, the sealed lithium-ion battery 10 is able to be manufactured (structured). Incidentally, the structure itself of the battery does not define the invention, so further detailed description thereof will be omitted. Hereinafter, the safety valve according to this example embodiment (i.e., the first example embodiment) will be described in detail.

Figure 3:
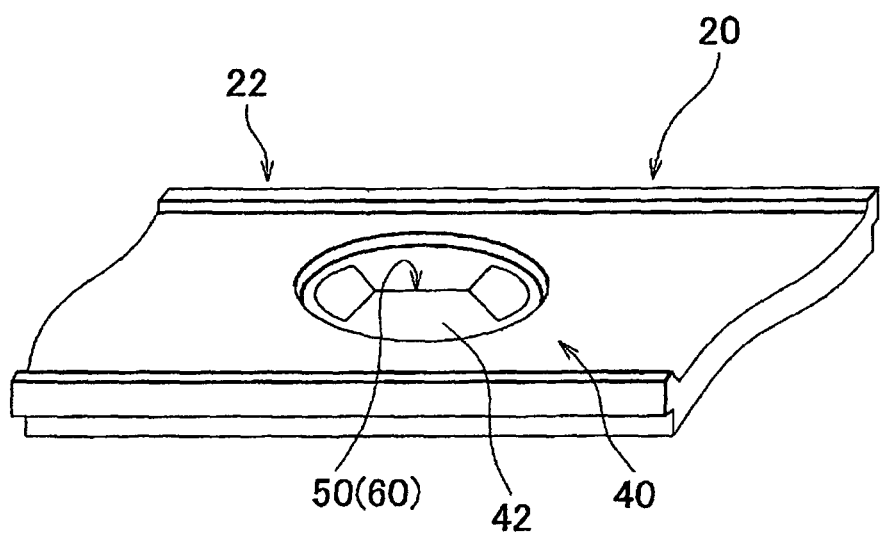
FIG. 3 is a perspective view showing a frame format of the structure of a safety valve of the sealed battery according to the first example embodiment of the invention.
Figure 4:
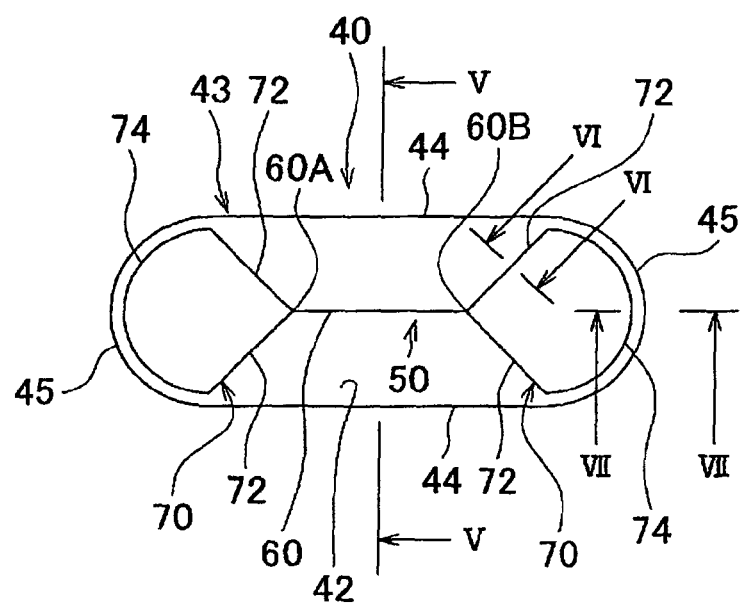
FIG. 4 is a plan view of the surface shape of the safety valve in FIG. 3.
Figure 5:
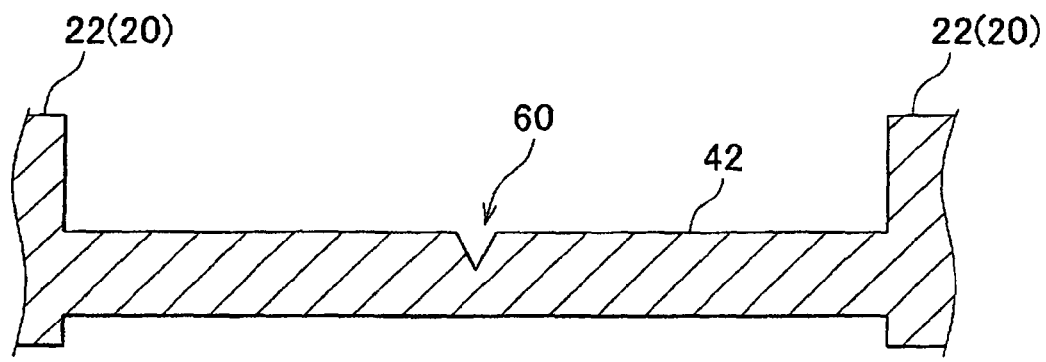
FIG. 5 is a sectional view taken along line V-V in FIG. 4.
Figure 6:
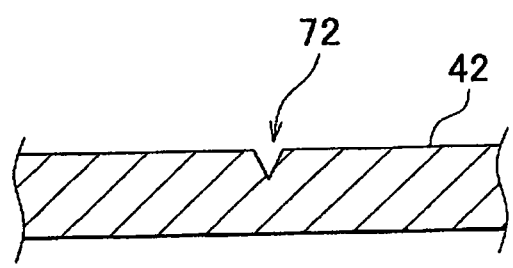
FIG. 6 is a sectional view taken along line VI-VI in FIG. 4.
Figure 7:
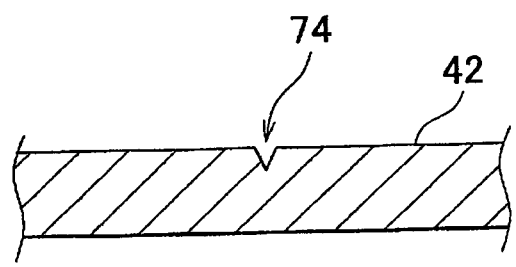
FIG. 7 is a sectional view taken along line VII-VII in FIG. 4.

FIG. 3 is an enlarged perspective view of the area around the safety valve 40 formed in the covering body 22 of the case 20. FIG. 4 is a plan view of the shape of the surface of the safety valve 40. Also, FIG. 5 is a sectional view taken along line V-V in FIG. 4, FIG. 6 is a sectional view taken along line VI-VI in FIG. 4, and FIG. 7 is a sectional view taken along line VII-VII in FIG. 4.

As shown in FIG. 3, the safety valve 40 according to this example embodiment is formed in a portion (here, the covering body 22) of the case 20, and includes a thin portion 42 that is thinner than the surrounding portions, and a fracture groove portion (i.e., an impressed portion) 50 formed in a predetermined pattern in the thin portion 42. The thin portion 42 is formed thinner (approximately 0.1 mm to 0.3 mm thick) than the surrounding case (the covering body is approximately 0.5 mm to 1 mm thick). Also, the thin portion 42 is formed having a horizontally long shape in which the size in the longer direction and the size in the shorter direction differ. More specifically, the thin portion 42 is formed in a so-called oval shape formed from a pair of straight outer edge portions 44 where the outer edge portion 43 follows the longer direction, and a semicircular curved outer edge portion 45 on both ends.

The fracture groove portion 50 according to this example embodiment that is formed in the oval thin portion 42 includes a center straight groove portion 60 that extends in the longer direction of the thin portion 42 in the center portion of the thin portion 42, and two pairs of side groove portions 70, one pair being formed on each side in the longer direction of the center straight groove portion 60 and connected to a corresponding longer direction end portion 60A and 60B of the center straight groove portion 60, as shown in FIG. 4. The sectional shape of these grooved portions is a V-shape that opens to the outer surface side of the thin portion 42.

As shown in the drawings, the side groove portions 70 are formed in sector loop shapes formed from curved groove portions 74 that are formed generally parallel to and with the same curvature as the curved outer edge portions 45 of the oval thin portion 42, and pairs of connecting straight edge groove portions 72 that connect the ends of the curved groove portions 74 to the end portions 60A and 60B of the center straight groove portion 60.

Also, as is evident from FIGS. 5 to 7, the different groove portions of the fracture groove portion 50 in this example embodiment are formed with different thicknesses. More specifically, the thickness of the center straight groove portion 60 is thinner than the thickness of the side groove portions 70, and at the sidegroove portions 70, the thickness of the connecting straight groove portions 72 is thinner than the thickness of the curved groove portions 74. Incidentally, the actual thickness of each of the groove portions is not limited because the pressure setting at which it is desirable to have the valve open differs according to the shape and use of the battery. An example of the thickness of the center straight groove portion 60 is approximately equal to or greater than 30 μm but less than 50 μm (e.g., 45 μm), and an example of the thickness of the side groove portions 70 is approximately equal to or greater than 50 μm but less than 100 μm (e.g., 55 μm). Also, the thickness of the connecting straight groove portions 72 of the side groove portions 70 is approximately equal to or greater than 50 μm but less than 80 μm (e.g., 55 μm), and the thickness of the curved groove portions 74 of the side groove portions 70 is approximately equal to or greater than 80 μm but less than 100 μm (e.g., 95 μm).

Providing the safety valve 40 with this kind of structure enables the safety valve 40 of the sealed lithium-ion battery 10 according to the example embodiment to open efficiently if the internal pressure of the case 20 becomes equal to or greater than a predetermined level, which in turn allows the gas produced inside the case 20 to be released quickly. More specifically, as shown in FIG. 8, both sides 42A and 42B of the thin portion 42 that oppose one another via the center straight groove portion 60 turn upward and outward, and both end portions 42C and 42D in the longer direction (also simply referred to as longer direction end portions in this specification) of the thin portion 42 turn upward and outward independently from the fracturing (i.e., the splitting) of the connecting straight groove portions 72 of the side groove portions 70 and the fracturing (i.e., the splitting) of at least a portion of the curved groove portions 74. As a result, the oval thin portion 42 opens up by dividing into a total of four portions 42A, 42B, 42C, and 42D to form an open portion S that is sufficient to release the gas in the battery quickly and thus reduce the pressure inside the case quickly.

<Assessment>

A valve-opening assessment was performed on a test piece that included a safety valve having the same shape as that of the sealed battery provided with the safety valve according to this example embodiment in order to empirically confirm the performance of the sealed battery provided with the safety valve according to this example embodiment.

As the test piece of the example embodiment, a thin portion 42 that is oval shaped as shown in FIG. 4 and that is approximately 13 mm in the longer direction, approximately 5 mm in the shorter direction, and approximately 100 μm thick was formed in a portion of a sealable case made of aluminum that is approximately 1 mm thick. Also, the fracture groove portion 50 was formed in the pattern shown in FIG. 4. Further, a center straight groove portion 60 that is approximately 4 mm long in the longer direction is formed in the center portion of the thin portion 42, and two connecting straight groove portions 72 were formed extending from each end 60A and 60B of the center straight groove portion 60. The angle between the connecting straight groove portions 72 was approximately 90 degrees. The distance between the end portions of the connecting straight groove portions 72 and the outer edge portions 43 was approximately 1 mm. Curved groove portions 74 that connect the end portions of the two connecting straight groove portions 72 together while maintaining that distance were formed along the curved outer edge portions 45. A plurality of individual test pieces each provided with the safety valve of the shape described above were manufactured.

Also, as a test piece for a comparative example, a plurality of individual test pieces each provided with a safety valve having the same shape as that of the test piece of the example embodiment (see FIG. 4), except without the curved groove portions in the side groove portions, were manufactured.

In this assessment, the fracture groove portion described above was formed changing the set valve-opening pressure for each test piece, and changing the depth of the groove portion (i.e., the thickness of the groove portion) for each test piece according to that set valve-opening pressure, taking the relationship between the pre-checked pressure in the case and the groove depth when the aluminum material that forms the safety valve fractures into account. Incidentally, this assessment focused on the shape (i.e., the pattern) of the fracture groove portion that affects the opening of the thin portion, so the thicknesses of the center straight groove portion and the side groove portions were made the same.

Then, with each test piece, the internal pressure of the case was gradually increased, and the internal pressure (i.e., the actual valve-opening pressure) when the thin portion (i.e., the fracture groove portion) actually split was measured. Also, the opening area when the valve opened was measured and compared with a set opening area (i.e., an opening area with an ideal opening shape such as that shown in FIG. 8 described above). In the assessment, the set valve-opening pressures of the test pieces of the example embodiment were 0.3 to 0.9 MPa, and the set valve-opening pressures of the test pieces of the comparative example were 0.5 to 1.1 MPa. The results of the test pieces of the example embodiment are shown in Table 1 and the results of the test pieces of the comparative example are shown in Table 2.

TABLE 1

| Set valve-opening pressure (MPa) | Actual valve-opening pressure (MPa) | Set opening area (mm$^2$) | Opening area after valve opened (mm$^2$) |
|---|---|---|---|
| 0.30 | 0.31 | 58.0 | 58.5 |
| 0.40 | 0.42 | | 58.2 |
| 0.50 | 0.51 | | 58.7 |
| 0.60 | 0.61 | | 58.6 |
| 0.70 | 0.73 | | 58.6 |
| 0.80 | 0.82 | | 58.7 |
| 0.90 | 0.90 | | 59.8 |

TABLE 2

| Set valve-opening pressure (MPa) | Actual valve-opening pressure (MPa) | Set opening area (mm$^2$) | Opening area after valve opened (mm$^2$) |
|---|---|---|---|
| 0.50 | 0.57 | 58.0 | 46.1 |
| 0.60 | 0.62 | | 44.4 |
| 0.70 | 0.75 | | 48.5 |
| 0.80 | 0.82 | | 49.8 |
| 0.90 | 0.94 | | 56.4 |
| 1.00 | 1.05 | | 52.5 |
| 1.10 | 1.12 | | 56.1 |

As shown in Table 1, with the test pieces of the example embodiment provided with the safety valve having the curved groove portion 74, an actual valve-opening pressure of approximately the same level was measured for all of the set valve-opening pressures. Also, the opening area after the valve opened was approximately the same as the set opening area. This confirmed that, providing the curved groove portions 74 in the side groove portions 70 as in the example embodiment (or more particularly, forming the side groove portions 70 having the curved groove portions 74) enabled a safety valve 40 to be made that opens efficiently when the internal pressure of the case (here the set valve-opening pressure) reaches a predetermined level, and that is able to maintain a sufficient opening area when the valve is open.

Incidentally, with this assessment, a center straight groove portion of approximately 4 mm, which is equal to or less than one-half of the length in the longer direction of the thin portion which is approximately 13 mm. Specifying the length of the center straight groove portion in this way makes it possible to make the level of the stress applied to the center straight groove portion when the internal pressure of the case rises substantially equal across the entire center straight groove portion, and thus enables a smoother fracture (split) to be achieved at the center straight groove portion.

To experimentally confirm this, a thin portion that is oval shaped as shown in FIG. 4 and approximately 13 mm in the longer direction, approximately 5 mm in the shorter direction, and 200 μm thick was formed on a portion of an aluminum sheet of a predetermined thickness (approximately 1 mm). Also, a thin portion having the same shape except for that the thickness of the thin portion is 300 μm was also formed. The stress distribution (Mises stress) in the longer direction of the center line through the center of the shorter direction was examined for these two thin portions by applying pressure of a predetermined level.

Figures 9A, 9B:
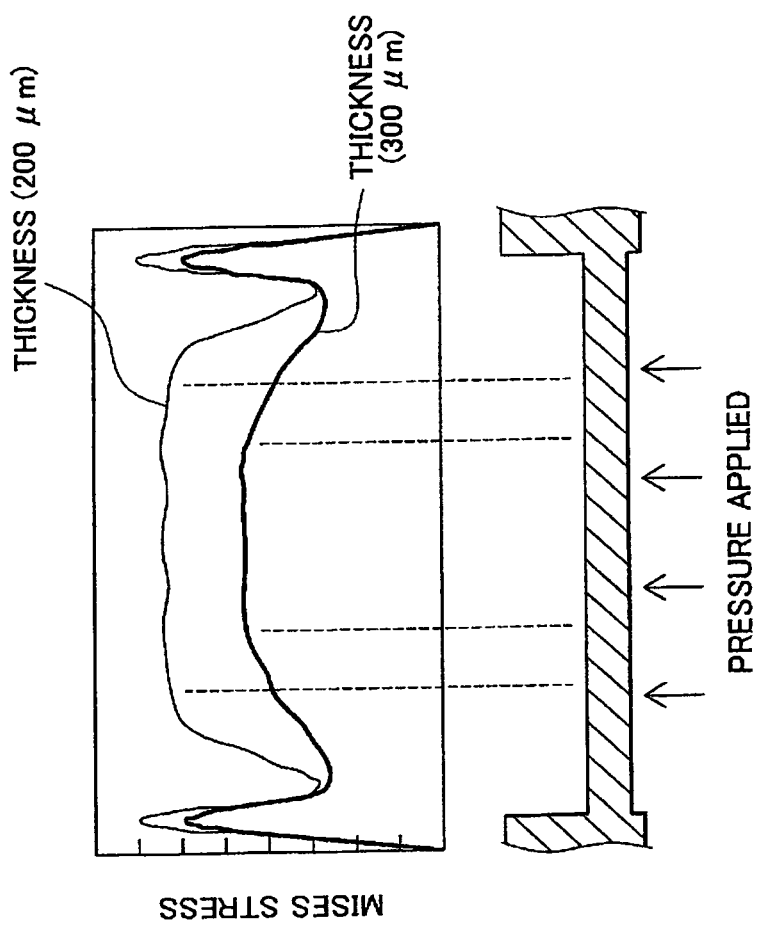
FIG. 9A is a graph showing the Mises stress distribution at the center (centre) line in the longer direction of the thin portion.
FIG. 9B is a supporting illustration showing the Mises stress distribution at the center line in the longer direction of the thin portion.

FIG. 9A shows the results of the experiment. The vertical axis represents the degree of Mises stress, and the horizontal axis represents the relative position of the center line in the longer direction of the test thin portion. FIG. 9B is a supporting illustration showing the relative position of the center line in the longer direction of the test thin portion. As is evident from the graph in FIG. 9A, the stress is uniformly concentrated up to approximately one-half (or more specifically, one-third) of the overall length including the center in the longer direction of the thin portion. Accordingly, good results can be obtained if a center straight groove portion is formed having an overall length that includes the center in the longer direction of the thin portion of approximately equal to or less than one-half (such as approximately one-half to one-fourth), or more specifically, equal to or less than one-third (such as approximately one-third to one-fourth), such that the stress concentrates substantially uniformly over the entire center straight groove portion. As a result, dispersion in the fracture initiating pressure (i.e., the valve-opening pressure) of the center straight groove portion among individual battery products can be prevented.

Figure 10:
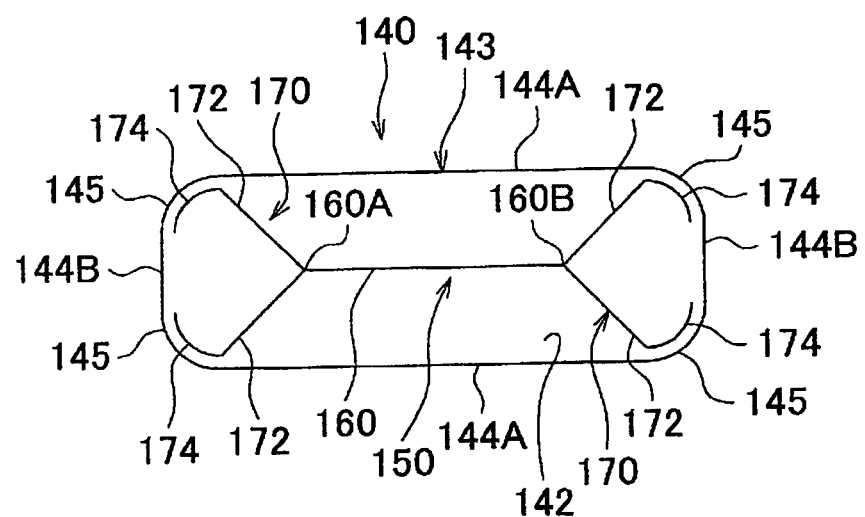
FIG. 10 is a plan view of the surface shape of a safety valve according to a second example embodiment of the invention.

Next, a safety valve according to a second example embodiment of the invention, as well as a battery provided with this safety valve, will be described. As shown in FIG. 10, a thin portion 142 of the safety valve 140 of this example embodiment is formed in a so-called round-cornered long shape in which the outer edge portion 143 includes a pair of straight outer edge portions 144A that extend in the longer direction, a pair of straight outer edge portions 144B that extend in the shorter direction, and curved outer edge portions 145 at the four corner portions. Meanwhile, similar to the first example embodiment described above, a fracture groove portion 150 according to the example embodiment that is formed in the round-cornered long thin portion 142 includes a center straight groove portion 160 that extends in the longer direction of the thin portion 142 in the center portion of the thin portion 142, and two pairs of side groove portions 170, one pair being formed on each side in the longer direction of the center straight groove portion 160 and connected to a corresponding longer direction end portion 160A and 160B of the center straight groove portion 160. The sectional shape of these grooved portions is the same as that described in the first example embodiment. The length of the center straight groove portion 160 is equal to or less than one-half (such as approximately one-half to one-quarter) of the length in the longer direction of the thin portion 142. The side groove portions 170 are made up of curved groove portions 174 formed close and generally parallel to, with the same curvature as, the curved outer edge portions 145 that correspond to the four corners of the round-cornered thin portion 142, and pairs of connecting straight edge groove portions 172 that connect one end portion of each of the curved groove portions 174 to the end portions 160A and 160B of the center straight groove portion 160. Incidentally, the side groove portions 170 in this example embodiment are not formed in a loop configuration.

Similar to the first example embodiment, with the safety valve 140 provided with the fracture groove portion 150 of this kind of pattern, when the internal pressure of the case rises to the predetermined level, the valve is able to open smoothly and a wide opening area is able to be achieved. That is, an opening that extends over almost the entire region of the thin portion 142 is able to be realized by both sides of the thin portion 142 that oppose one another via the center straight groove portion 160 turning upward and outward, and the connecting straight groove portions 172 and the curved groove portions 174 of the side groove portions 170 then fracturing (i.e., splitting). As a result, the gas inside the battery can be quickly released, thus enabling the internal pressure of the case to be quickly decreased. Incidentally, in this example embodiment as well, the groove portions may also be formed with different thicknesses at each portion. More specifically, the thickness of the center straight groove portion 160 may be formed thinner than the thickness of the side groove portions 170, and at the side curved portions 170, the thickness of the connecting straight groove portions 172 may be formed thinner than the thickness of the curved groove portions 174. The examples of the sizes are the same as they are in the first example embodiment described above so a redundant description will be omitted.

In this example embodiment, two curved groove portions 174 (i.e., a curved groove portion 174 that is divided into two) is formed for each pair of connecting straight groove portions 172, but the invention is not limited to this. That is, a single curved groove portion may be provided, or a curved groove portion formed discontinuously in a dashed-line shape may be provided. That is, the invention is not limited as long as at least a portion is formed curved following the curved outer edge portion.

Figure 11:
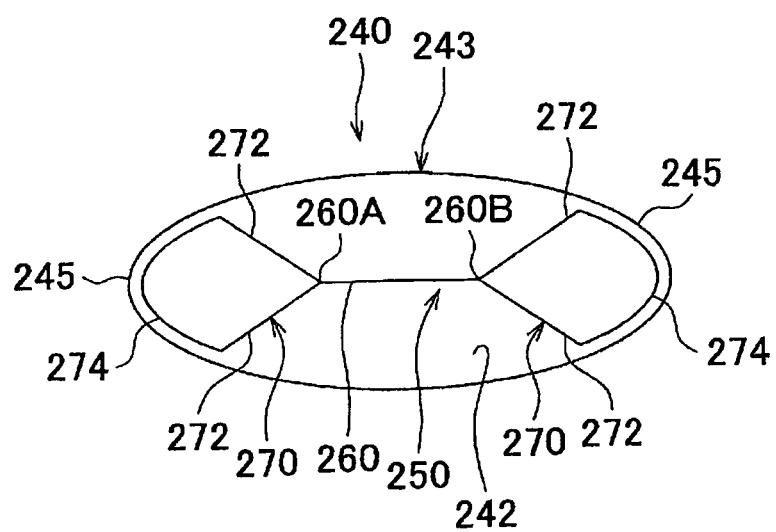
FIG. 11 is a plan view of the surface shape of a safety valve according to a third example embodiment of the invention.

Next, a safety valve according to a third example embodiment of the invention, as well as a battery provided with this safety valve mill, be described. As shown in FIG. 11, a thin portion 242 of the safety valve 240 of this example embodiment is formed in an elliptic shape in which the lengths in the longer direction and the shorter direction of the outer edge portion 243 differ. Meanwhile, a fracture groove portion 250 according to this example embodiment is formed in the same pattern as that described in the first example embodiment. That is, the fracture groove portion 250 includes a center straight groove portion 260 that extends in the longer direction of the thin portion 242 in the center portion of the thin portion 242, and two pairs of side groove portions 270, one pair being formed on each side in the longer direction of the center straight groove portion 260 and connected to a corresponding longer direction end portion 260A and 260B of the center straight groove portion 260. The sectional shape of these grooved portions is the same as that described in the first example embodiment. The length of the center straight groove portion 260 is equal to or less than one-half (such as approximately one-half to one-quarter) of the length in the longer direction of the thin portion 242. As shown in the drawing, the side groove portions 270 are formed in sector loop shapes made up of curved groove portions 274 formed close and generally parallel to, with the same curvature as, the curved outer edge portions 245 of the portions at both end portions in the longer direction, of the outer edge portion 243 (i.e., the entire periphery is a curved outer edge portion) of the elliptical thin portion 242, and pairs of connecting straight edge groove portions 272 that connect the ends of the curved groove portions 274 to the end portions 260A and 260B of the center straight groove portion 260.

Similar to the first example embodiment, with the safety valve 240 provided with this kind of elliptical thin portion 242 and the fracture groove portion 250 of the pattern described above, when the internal pressure of the case rises to the predetermined level, the valve is able to open smoothly and a wide opening area is able to be achieved. That is, an opening that extends over almost the entire region of the thin portion 242 is able to be realized by both sides of the thin portion 242 that oppose one another via the center straight groove portion 260 turning upward and outward, and the connecting straight groove portions 272 and the curved groove portions 274 of the side groove portions 270 then fracturing (i.e., splitting) (see FIG. 8). As a result, the gas inside the battery can be quickly released, thus enabling the internal pressure of the case to be quickly decreased.

Incidentally, although not shown, supplementary connecting curved groove portions may also be formed close and generally parallel to the outer peripheral edge portion 243 from one curved groove portion 274 to the other curved end portion 274, so as to connect the curved groove portions 274 of the two side groove portions 270 that are on both ends in the longer direction. Forming these kinds of supplementary connecting curved groove portions enables the portions of the thin portion 242 that are on bath sides of the center straight groove portion 260 to open even more smoothly. Also, in this example embodiment as well, the groove portions may also be formed with different thicknesses at each portion. More specifically, the thickness of the center straight groove portion 260 may be formed thinner than the thickness of the side groove portions 270, and at the side curved portions 270, the thickness of the connecting straight groove portions 272 may be formed thinner than the thickness of the curved groove portions 274. The examples of the sizes are the same as they are in the first example embodiment described above so a redundant description will be omitted.

Figures 12A, 12B:
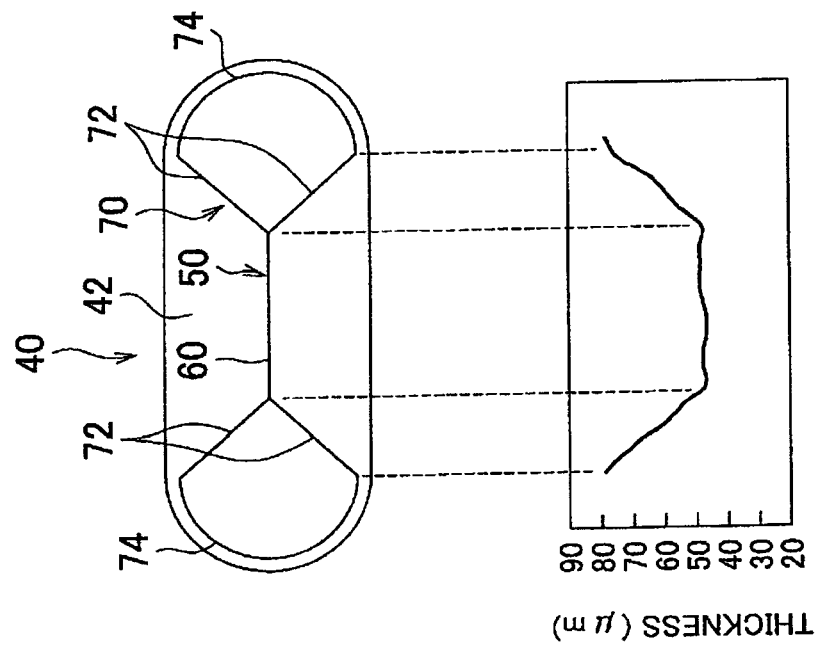
FIG. 12A is a graph showing the manner of change in the thickness of the side groove portion and the center straight groove portion of a safety valve according to a modified example of the first example embodiment of the invention.
FIG. 12B is a supporting illustration showing the manner of change in the thickness of the side groove portion and the center straight groove portion of the safety valve according to the modified example of the first example embodiment of the invention.

While several example embodiments in which the pattern of the fracture groove portion and the shape of the thin portion differ have been described, the invention is not limited to these. For example, in the example embodiments described above, an example was described in which the difference in the thickness of the groove portion (i.e., the groove depth) differed between the center straight groove portion and the side groove portions, as well as between the connecting straight groove portions and the curved groove portions of the side groove portions. However, the invention is not limited to this. For example, as shown in the graph of FIG. 12B, the thickness of the center straight groove portion 60 in the first example embodiment may be constant while the thickness of the connecting straight groove portions 72 of the side groove portions 70 may be continuously or incrementally increased farther away from the center straight groove portion 60.

Making the thickness of the groove portion in this way facilitates sequential fracturing (i.e., splitting) in stages of the side groove portions 70 from the area toward the center of the thin portion 42 toward the ends in the longer direction after the center straight groove portion 60 has fractured (i.e., split), and facilitates smooth opening of the valve over a wide opening area.

Figures 13A, 13B:
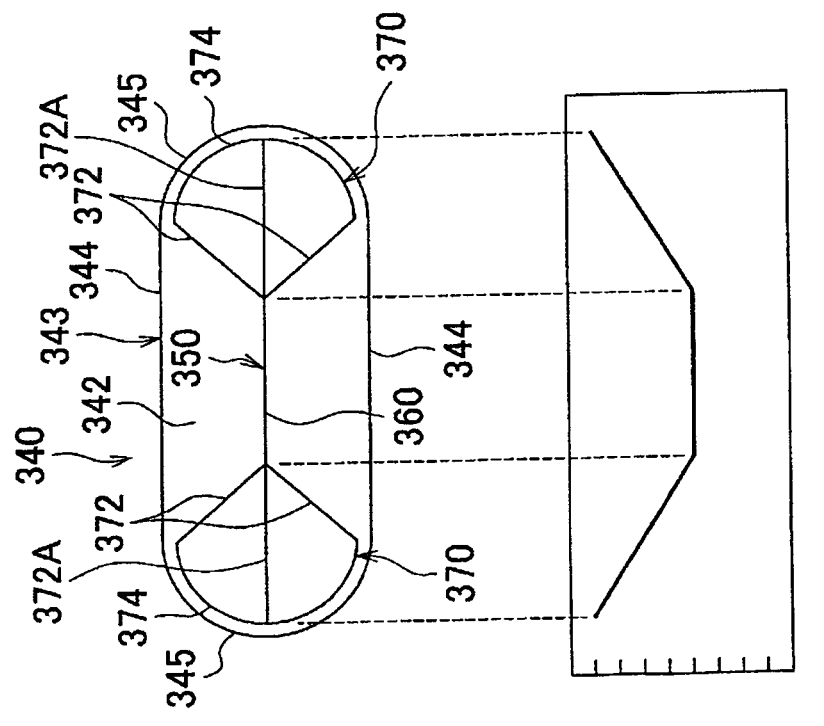
FIG. 13A is a graph showing the manner of change in the thickness of the side groove portion and the center straight groove portion of a safety valve according to a fourth example embodiment of the invention.
FIG. 13B is a supporting illustration showing the mariner of change in the thickness of the side groove portion and the center straight groove portion of the safety valve according to the fourth example embodiment of the invention.

Next, a safety valve according to a fourth example embodiment of the invention, as well as a battery provided with that safety valve, will be described. As shown in FIG. 13B, side groove portions 370 include extended portions 372A that extends a center straight groove portion 360 of a fracture groove portion 350 to abut against curved groove portions 374 of the side groove portions 370. In this case, the extended portions 372 are also able to function as connecting straight groove portions. Incidentally, except for that the center straight groove portion extends to both end sides in the longer direction, the safety valve 340 according to this example embodiment has the same structure as the safety valve 40 according to the first example embodiment. Just as shown in FIGS. 12A and 12B, the thickness of the center straight groove portion 360 is constant while the thickness of the extended portions (i.e., one connecting straight groove portion) 372A may be continuously or incrementally increased farther away from the center straight groove portion 360 (FIG. 13A).

The invention is not limited to the example embodiments above, but may of course be modified in any of a variety of ways. For example, the type of battery is not limited to the lithium-ion battery described above, but may alternatively be a battery with different types of electrode body constituent material and electrolytes, such as a nickel-cadmium battery, a nickel-metal hydride battery, or a lithium secondary battery in which a lithium metal or a lithium alloy is used for the negative electrode.

Figure 14:
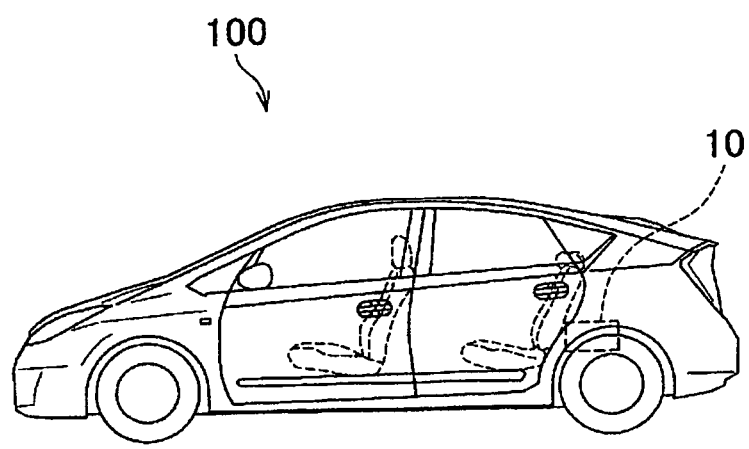
FIG. 14 is a side view showing a frame format of a vehicle provided with a sealed battery according to the example embodiments of the invention.
Figure 15:
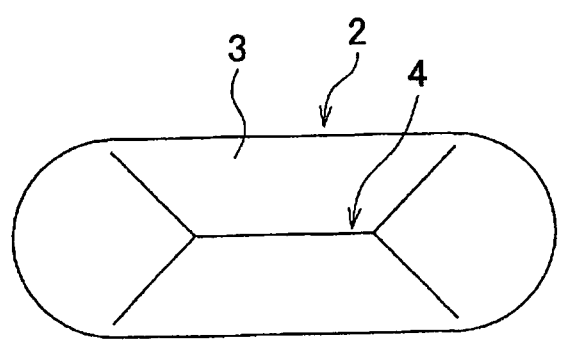
FIG. 15 is a plane view of the surface shape of a safety valve according to related art.
Figure 16:
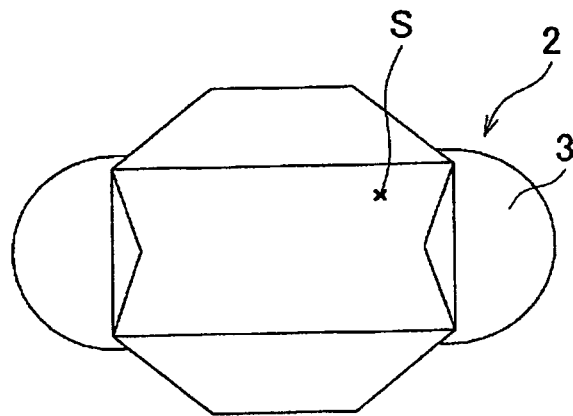
FIG. 16 is a view showing a frame format of the safety valve shown in FIG. 15 in a typical open state.

Also, the sealed battery described here is able to be used as a power supply for a motor (an electric motor) mounted in a vehicle such as an automobile, in particular, because when the internal pressure of the case rises excessively, that internal pressure is able to be quickly reduced (in other words, the gas produced inside the case is able to be quickly released). Therefore, as shown in frame format in FIG. 14, the invention is able to provide a vehicle (typically an automobile, more particularly, an automobile provided with an electric motor such as a hybrid vehicle or an electric vehicle) that is provided with the sealed battery 10 (typically, a battery pack formed a plurality of batteries 10 that are electrically connected together) as the power supply.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A sealed battery comprising:
an electrode body that forms a positive electrode and a negative electrode;
an electrolyte; and
a sealed case that houses the electrode body and the electrolyte,
wherein a safety valve that opens when internal pressure of the case rises to equal to or greater than a predetermined value is formed in a portion of the case;
wherein the safety valve includes a thin portion formed thinner than the surrounding portion of the safety valve, and a fracture groove portion formed in the thin portion;
wherein the thin portion differs in size between a longer direction and a shorter direction, and includes a curved outer edge portion in which at least a portion of an outer edge portion of the thin portion at both ends, or near both ends, in the longer direction is formed so as to the curved;
wherein the fracture groove portion includes a center straight groove portion that extends in the longer direction of the thin portion in a center portion of the thin portion, and a pair of side groove portions, each of which is formed on either side in the longer direction of the center straight groove portion and connected to a corresponding longer direction end portion of the center straight groove portion;
wherein at least a portion of the side groove portions is formed so as to be curved following the curved outer edge portion; and wherein the side groove portions become thicker in a continuous or stepped manner farther away from the center straight groove portion.

2. The sealed battery according to claim 1, wherein the fracture groove portion is formed such that the thickness of the center straight groove portion is thinner than the thickness of the side groove portions.

3. The sealed battery according to claim 2, wherein the thin portion is formed in an oval shape, a round-cornered rectangular shape, or an elliptical shape, in which the outer edge of both end sides in the longer direction is formed by the curved outer edge portion; and the side groove portions of the fracture groove portion each include a curved groove portion formed in a curved shape that follows the curved outer edge portion of the oval-shaped or elliptical-shaped thin portion, and a pair of connecting straight groove portions that connect the corresponding longer direction end portion of the center straight groove portion to both ends of the curved groove portion.

4. The sealed battery according to claim 3, wherein the curved groove portion is formed as a continuous curved groove portion or a discontinuous curved groove portion.

5. The sealed battery according to claim 3, wherein the thickness of the connecting straight groove portions of the side groove portions is thinner than the thickness of the curved groove portions.

6. The sealed battery according to claim 3, wherein the thickness of the center straight groove portion is approximately equal to or greater than 30 μm but less than 50 μm, and the thickness of the side groove portions is approximately equal to or greater than 50 μm but less than 100 μm.

7. The sealed battery according to claim 3, wherein the thickness of the connecting straight groove portions is approximately equal to or greater than 50 μm but less than 80 μm, and the thickness of the curved groove portions is approximately equal to or greater than 80 μm but less than 100 μm.

8. The sealed battery according to claim 2, wherein the center straight groove portion is formed in the longer direction in the center portion of the thin portion so as to have a length that is equal to or less than one-half of the length in the longer direction of the thin portion.

9. The sealed battery according to claim 2, wherein each of the side groove portions includes an extended portion that extends the center straight groove portion of the fracture groove portion to abut against the curved groove portion of the side groove portion.

10. The sealed battery according to claim 2, wherein the sealed battery is a lithium secondary battery.

11. A vehicle comprising the sealed battery according to claim 2.

12. The sealed battery according to claim 1, wherein the side groove portions of the fracture groove portion each include a curved groove portion formed in a curved shape that follows the curved outer edge portion of the thin portion, and a pair of connecting straight groove portions that connect the corresponding longer direction end portion of the center straight groove portion to both ends of the curved groove portion.

13. The sealed battery according to claim 1, wherein the thin portion is configured to open by dividing into four portions to form an open portion.

14. A sealed battery comprising:
an electrode body that forms a positive electrode and a negative electrode;
an electrolyte; and
a sealed case that houses the electrode body and the electrolyte,
wherein a safety valve that opens when internal pressure of the case rises to equal to or greater than a predetermined value is formed in a portion of the case;
wherein the safety valve includes a thin portion formed thinner than the surrounding portion of the safety valve, and a fracture groove portion formed in the thin portion;
wherein the thin portion differs in size between a longer direction and a shorter direction, and includes a curved outer edge portion in which at least a portion of an outer edge portion of the thin portion at both ends, or near both ends, in the longer direction is formed so as to be curved;
wherein the fracture groove portion includes a center straight groove portion that extends in the longer direction of the thin portion in a center portion of the thin portion, and a pair of side groove portions, each of which is formed on either side in the longer direction of the center straight groove portion and connected to a corresponding longer direction end portion of the center straight groove portion;
wherein at least a portion of the side groove portions is formed so as to be curved following the curved outer edge portion; and
wherein the side groove portions are loop groove portions including a curved groove portion formed in a curved shape that follows the curved outer edge portion and a pair of connecting straight groove portions that connects the corresponding loaner direction end portion of the center straight groove portion to bath ends of the curved groove portion.

* * * * *